United States Patent
Asokan et al.

(10) Patent No.: US 10,482,238 B2
(45) Date of Patent: *Nov. 19, 2019

(54) METHOD AND DEVICE FOR VERIFYING THE INTEGRITY OF PLATFORM SOFTWARE OF AN ELECTRONIC DEVICE

(71) Applicant: Conversant Wireless Licensing S.a.r.l., Luxembourg (LU)

(72) Inventors: Nadarajah Asokan, Espoo (FI); Janne Mantyla, Espoo (FI); Reza Serafat, Bochum (DE)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,284

(22) Filed: Dec. 19, 2017

(65) Prior Publication Data

US 2018/0253546 A1 Sep. 6, 2018

Related U.S. Application Data (63) Continuation of application No. 15/237,871, filed on Aug. 16, 2016, now Pat. No. 9,881,150, which is a (Continued)

(51) Int. Cl.
*H04L 29/06* (2006.01)
*G06F 21/51* (2013.01)
*H04L 9/32* (2006.01)

(52) U.S. Cl.
CPC ............ *G06F 21/51* (2013.01); *H04L 9/3242* (2013.01); *H04L 9/3247* (2013.01); *H04L 63/12* (2013.01); *H04L 63/168* (2013.01)

(58) Field of Classification Search
CPC .............................. G06F 21/51; H04L 9/3242
(Continued)

(56) References Cited

U.S. PATENT DOCUMENTS 4,670,857 A 6/1987 Rackman
5,692,047 A 11/1997 McManis
(Continued)

FOREIGN PATENT DOCUMENTS

EP 0816970 1/1998

OTHER PUBLICATIONS

Williams, "Anti-Trojan and Trojan Detection with In-Kernel Digital Signature Testing of Executables", Technical Report, NetXSecure NZ Limited (Apr. 16, 2002), pp. 1-12.
(Continued)

*Primary Examiner* — Anthony D Brown
(74) *Attorney, Agent, or Firm* — Conversant Wireless Licensing (57) ABSTRACT

A method for verifying the integrity of platform software of an electronic device is provided, the method comprising accessing a module of said platform software, obtaining a signature (S), obtaining a verification key (VK), said verification key (VK) corresponding to a signing key (SK), verifying if said signature (S) was derived by signing said platform software module with said signing key (SK), by using said verification key (VK), and establishing a positive verification of said platform software module if said verification is successful. The invention also provides a method for providing a platform software module to perform the aforementioned method, and a device on which the aforementioned method can be performed.

22 Claims, 7 Drawing Sheets

Related U.S. Application Data continuation of application No. 14/503,264, filed on Sep. 30, 2014, now Pat. No. 9,438,608, which is a continuation of application No. 11/791,285, filed as application No. PCT/IB2004/003805 on Nov. 22, 2004, now Pat. No. 8,954,738.

(58) Field of Classification Search
USPC .......................................................... 713/168
See application file for complete search history.

(56) References Cited

U.S. PATENT DOCUMENTS

| | | | |
|---|---|---|---|
| 6,141,756 | A | 10/2000 | Bright et al. |
| 6,149,522 | A | 11/2000 | Alcorn et al. |
| 6,223,291 | B1 | 4/2001 | Puhl et al. |
| 6,279,111 | B1 | 8/2001 | Jensenworth et al. |
| 6,697,948 | B1 | 2/2004 | Rabin et al. |
| 7,853,793 | B2 | 12/2010 | Cofta et al. |
| 8,954,738 | B2 | 2/2015 | Asokan et al. |
| 9,438,608 | B2 | 9/2016 | Asokan et al. |
| 2002/0138554 | A1 | 9/2002 | Feigen et al. |
| 2003/0037262 | A1 | 2/2003 | Hillhouse |
| 2003/0229777 | A1 | 12/2003 | Morais et al. |
| 2004/0025022 | A1* | 2/2004 | Yach ................... G06F 21/121 713/176 |
| 2004/0039925 | A1 | 2/2004 | McMillan et al. |
| 2004/0054906 | A1 | 3/2004 | Carro |
| 2004/0220975 | A1 | 11/2004 | Carpentier et al. |
| 2005/0091496 | A1 | 4/2005 | Hyser |
| 2006/0004662 | A1* | 1/2006 | Nadalin ................. H04L 63/02 705/50 |
| 2006/0020810 | A1 | 1/2006 | Waltermann et al. |
| 2017/0091443 | A1 | 3/2017 | Asokan et al. |

OTHER PUBLICATIONS

Apvrille et al., "DigSig: Run-time Authentication of Binaries at Kernel Level", Proc. of LISA '04: Eighteenth Systems Administration Conference (Nov. 2004), pp. 59-66.

Zakrzewski et al., "Linux Distributed Security Module", Linux Journal, Issue #102 (Oct. 2002).

Kroah-Hartman, "Signed Kernel Modules", Linux Journal (Jan. 1, 2004, 8 pages).

Apvrille et al., "Stop Malicious Code Execution at Kernel-Level", Linux World, vol. 2, No. 1 (Jan. 2004).

International Search Report of International Application No. PCT/IB2004/003805—Date of Completion of Search—Jun. 27, 2005.

Rosenblit, Moshe, "Secure Software Distribution", Bellcore, 1994, XP10261000A, pp. 486-496.

Maruyama et al., "Trusted Platform on demand (TPod)," Technical Report (Citeseer, 2004).

Sailer et al., "Design and Implementation of a TCG-based Integrity Measurement Architecture," Proc. 13th USENIX Security Symposium (USENIX Assoc., 2004), pp.

"TCG Specification Architecture Overview," Specification Revision 1.2 (TCG, 2004).

\* cited by examiner

METHOD AND DEVICE FOR VERIFYING THE INTEGRITY OF PLATFORM SOFTWARE OF AN ELECTRONIC DEVICE

CROSS-REFERENCE TO RELATED APPLICATIONS

This patent application is a continuation application of application Ser. No. 15/237,871 filed Aug. 16, 2016; which in turn is a continuation of application Ser. No. 14/503,264 filed on Sep. 9, 2014, now U.S. Pat. No. 9,438,608; which in turn is a continuation of application Ser. No. 11/791,285 filed on Mar. 6, 2008, now U.S. Pat. No. 8,954,738; which is a national stage application of PCT Publication No. 2006/054128 (PCT Patent Application No. PCT/IB2004/003805 filed on Nov. 22, 2004). The subject matter of the previously filed applications are hereby incorporated by reference.

The present invention relates to methods and a device for enabling application software to verify the integrity of platform software of an electronic device.

A software platform on an electronic device is an operating system or a runtime environment (like Java or a mobile agent platform) by which software is loaded and executed. A typical piece of software is, for example, a game application that can be executed on a device with a suitable software platform. In order to provide a wide variety of compatible devices and software applications, different manufacturers may use the same software platform on their products. While the software platform or operating system is thus similar or even identical, the products equipped with it, however, usually comprise very specific hardware. Also, while the core of the platform software might be identical, there are lots of other parts like devices drivers which may not be identical or even at all present in different electronic devices.

So a situation may occur where a software application is to be executed on a device with an unsuitable software platform or hardware. Some reasons for unsuitability are, for example, an insufficient amount of Random-Access Memory (RAM) for storing the needed data, a display without an adequate resolution and/or number of colours, missing online connectivity (W-LAN, bluetooth etc.), or a keyboard not including adequate control and action keys. If any of these requirements are not fulfilled, using the respective application on such a device might not be satisfactory for the user and be will be dissatisfied with the purchased piece of software. In some cases running an application on a wrong device may even result in loss of user data and or malfunctions of the device possibly requiring costly repair services.

Generally there also exists another kind of threat regarding software platforms and imported software, i.e. software from an external source, i.e. malicious software, or so-called "malware". A lot of attention has been paid to different kinds of methods for a software platform to verify the integrity of imported software. However also the inverse situation may be regarded, i.e., that the software platform may also subvert the operation of imported software. At the moment many protection schemes are based on different kinds of identifications such as device ID or Multi Media Card ID. In other words, the software application relies on a certain piece of platform software to retrieve a needed ID. If an attacker is able to spoof the needed ID, the whole protection scheme falls apart. Therefore the application itself should be able to verify that it is installed on a device that is able and authorised to run it.

In the state of the art a software application can verify the integrity of the software platform by computing a cryptographic hash for a selected software module of the platform software and comparing the hash with a hash contained in the verification routine of the software application. If the hashes correspond to each other the platform is successfully verified and the software application can be executed on the device. The selected software module may be, for example, software like device drivers or some other piece of software that is needed for running the application. The disadvantage of the conventional approach with a fixed expected hash value in the application is that any updates or replacements of a software module of the platform lead to a negative verification of the platform, which, in turn, results in non-execution of older applications. As it is rather common that the software of electronic devices like mobile phones and the like will have to be updated during their lifetime, e.g. to remove security flaws and software errors, such a conventional approach is not suitable to deal with these demands.

Therefore it is an object of the invention to remove or at least alleviate the problems discussed above.

To achieve this object the present invention provides methods and a device for enabling a verification of the integrity of a platform software of an electronic device.

According to a first aspect of the present invention a method for verifying the integrity of platform software of an electronic device is provided. The method comprises accessing a module of the platform software, obtaining a signature, obtaining a verification key, wherein the verification key corresponds to a signing key, using the verification key for verifying if the signature was derived by signing the platform software module with the signing key, and establishing a positive verification of the platform software module if the verification is successful. In this way the integrity of platform software can be verified by application software, to ensure that it will run on an authorized and suitable platform. In this fashion also old applications will be compatible with new or updated versions of platform software modules while still being enabled to verify the integrity.

According to one exemplary embodiment obtaining said signature is preceded by performing a hash function on the platform software module to derive a computed hash, obtaining an expected hash and comparing the computed hash and the expected hash. If the hashes correspond to each other the steps of the following method are performed. Further the verification of the signature comprises verifying if the signature was derived by signing the expected hash with the signing key, by using the verification key. Using hashes is a convenient way of doing the verification, also the additional check of the hashes before the signature is checked provides for an improved security.

According to one exemplary embodiment accessing of the module of the platform software is preceded by accessing a monitor module, performing a hash function on the monitor module to derive a second computed hash, then obtaining a second expected hash and comparing the hashes. If the hashes correspond to each other the method comprises invoking the monitor module to perform the following steps as mentioned before. Checking the integrity of a monitor module and using the monitor module to perform the integrity check of the platform software for an application may be advantageous if the monitor software is not likely to be changed when new parts of platform software are installed. In this fashion application software may be kept more simple and is required to use fewer steps for verification itself.

It should be noted that the keys SK (signing key) and VK (verification key) may be respective keys of an asymmetric key pair from a suitable public key digital signature scheme like RSA or DSS. However, it is also possible for SK and VK to be the same secret key K (K=SK=VK) to be used with a symmetric key digital signature scheme like HMAC_SHA1. The latter case may especially be useful in embodiments of the invention using the monitor module, as platform software module and monitor module are presumably provided by the same developer, so that it is tractable to use a shared symmetric key for signatures. The advantage here would be that the signatures will be much smaller.

In order to provide a more reliable integrity check from the application's point of view, the second expected hash may be embedded in the application.

According to one embodiment a negative verification of the monitor module is established and invocation of the monitor module is denied if the hashes do not correspond.

According to another embodiment a negative verification of the platform software module is established and further access to the platform software module is denied if the hashes do not correspond. A negative verification of the platform software module is also established and further access to the platform software module is denied if the verification of the signature is not successful. Hence, a positive verification may only be established when both checks succeed, which provides for a more reliable verification.

According to one exemplary embodiment, the verification key is embedded in the application performing the verification, or in the monitor module. Similar to the aforementioned this might help to improve reliability, as the verification key comes from an obviously trusted source.

According to one exemplary embodiment the expected hash is provided by the platform software module. The signature may also be provided by the platform software module. One way to provide the hash and the signature would be to have one or both of them included in the software module as static variables.

According to a second aspect of the invention a method for providing a platform software module for enabling a verification of the integrity of platform software of an electronic device is provided. The method comprises obtaining a platform software module, obtaining a signing key, deriving a signature by signing the platform software module with the signing key and providing the platform software module and the signature in the electronic device.

According to one exemplary embodiment the method further comprises performing a hash function on said platform software module to derive an expected hash, and additionally providing said expected hash in said electronic device. Further the deriving of said signature comprises signing said expected hash with said signing key.

According to one exemplary embodiment the platform software module is provided in the electronic device with the expected hash being integrated into the platform software module as a static variable. This is a convenient and reliable way to provide the hash.

According to one exemplary embodiment the signature is provided in the electronic device separate from the platform software module. This might be advantageous when the platform software module is stored in a location where an attacker cannot tamper with it, like a ROM or the like. Then the signature can also be provided separately.

According to another embodiment the platform software module is provided in the electronic device with the signature being integrated into the platform software module as a static variable. Similar to the aforementioned this is a convenient and reliable way to provide the signature.

The signing key and the verification key may be respective keys of an asymmetric key pair, e.g. of a public key/private key scheme.

In another embodiment of the invention the signing key and the verification key may be respective keys of a symmetric key pair. As already mentioned this may provide for smaller signatures and simplify the verification, while care has to be taken to keep the symmetric (secret) keys to trustworthy entities.

According to a third aspect of the invention a computer program product is provided, comprising program code means for carrying out a method as described before when the program product is run on a computer or network device.

According to a fourth aspect of the invention computer program product comprising program code means stored on a computer readable medium is provided, for carrying out a method as described before when the software tool is run on a computer or network device.

According to a fifth aspect of the invention a computer program product comprising program code means is provided, downloadable from a server for carrying out a method as described before when the program product is run on a computer or network device.

According to a sixth aspect of the invention an electronic device for enabling a verification of the integrity of platform software of an electronic device is provided. The device comprises a loader component adapted for accessing a module of the platform software and a receptor component adapted for obtaining a signature and a verification key. The device also comprises a verification component adapted for verifying the signature using the verification key.

According to one exemplary embodiment the electronic device further comprises a hash calculator component adapted for performing a hash function on said platform software module to derive a computed hash, and a comparator component adapted for comparing a computed hash from the hash calculator component and an expected hash obtained from the receptor component. The receptor component is further adapted for obtaining the expected hash, and the verification component is further adapted for verifying if the signature was derived by signing the expected hash with the signing key.

Further features and advantages of the present invention will become apparent from the following description and the accompanying drawings, in which.

Figure 1:
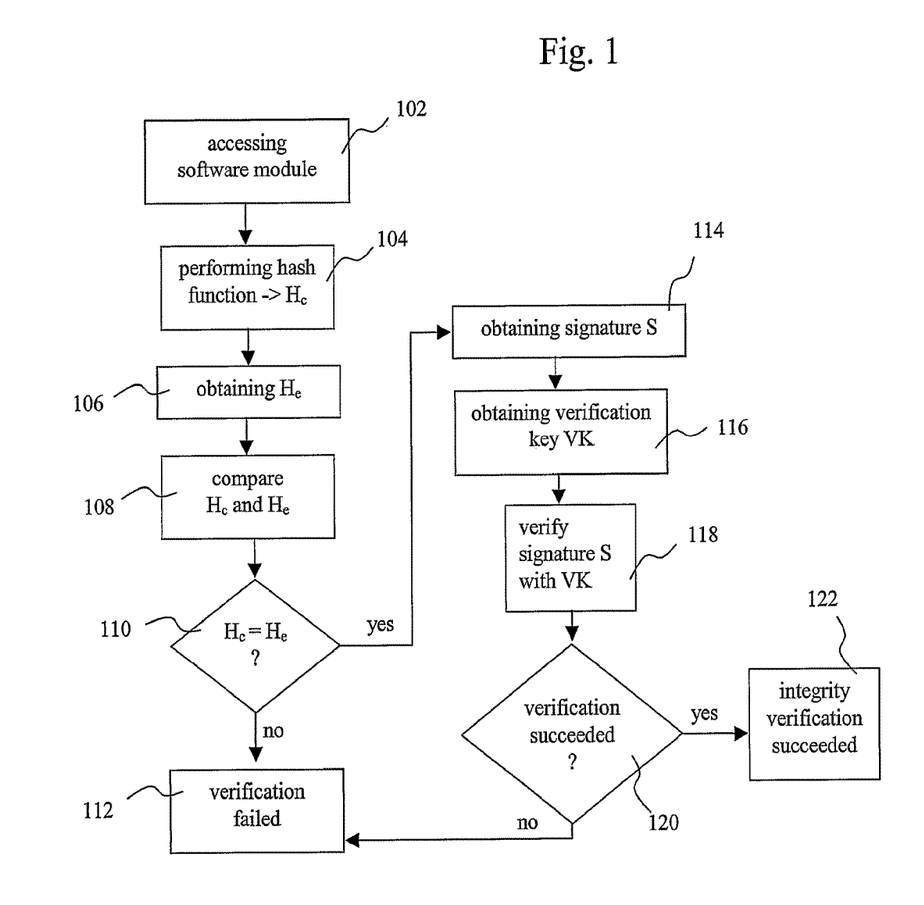
FIG. 1 is a schematic flow diagram of an embodiment of the inventive method.

In FIG. 1 the steps of an embodiment of the present invention are shown in a flow diagram. The process starts with accessing a software module of a platform software of an electronic device, step 102. This module may e.g. be a device driver or any other module of the platform software. In step 104 a hash function if performed on the module, to derive a hash $H_c$. As hash function all possible kinds may be used. In step 106 another hash, an expected $H_e$ is obtained. This hash $H_e$ can be provided by the accessed software module, but also other sources are conceivable. In step 108 the hashes $H_c$ and $H_e$ are compared to determine if they correspond. In its simplest implementation this will mean to determine if both hashes are completely identical. However it may also be possible to check if only a predetermined section of the hashes is identical, i.e. checking if they correspond in some aspect. If $H_c$ and $H_e$ are not corresponding to each other (step 110), verification fails and the process is ended with a negative outcome (step 112). If however $H_c$ and $H_e$ do correspond, in step 114 a signature S is obtained. This signature S may again be provided by the software module, but also by other sources. In step 116 a verification key VK is obtained, e.g. a public key of a private key/public key pair. The verification key VK has to be obtained from a trusted source, therefore this key VK will e.g. be embedded into the application software. However it can also be received from another source, provided this source may be trusted. In step 118 the signature S is verified using the verification key VK. Such verification procedures are per se known, so a detailed explanation is omitted here. If the verification succeeds (step 120) the verification procedure ends with a positive outcome (step 122), the platform software module is now verified and may be used by the application software. In case of a negative verification in step 120 verification fails (step 112) such that further access to the platform software module is denied.

Figure 2:
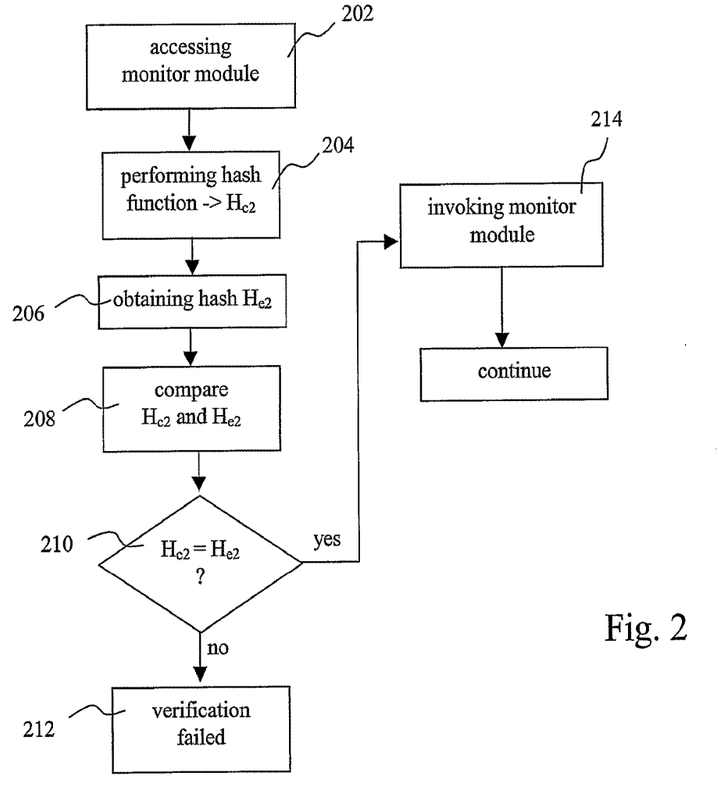
FIG. 2 is schematic flow diagram showing steps of an alternative embodiment of the inventive method preceding the steps depicted in FIG. 1.

FIG. 2 describes an alternative embodiment of the invention. In step 202 a monitor module being part of the platform software is accessed. Such a monitor module may be provided in the platform software for verifying other platform software modules. To use this monitor module a software first has to verify the integrity of this monitor module. As the monitor module is not expected to be changed like other parts of the platform software this can be performed using static integrity metrics. In step 204 a hash function is performed on the monitor module to compute a hash $H_{c2}$. A hash $H_{e2}$ is obtained in step 206. Similar to the process in FIG. 1 the hashes $H_{c2}$ and $H_{e2}$ are compared to determine if the correspond. If it is confirmed in step 210 that they do correspond the process continues with step 214. Of course otherwise verification will fail (step 212), the monitor module is not verified and will not be invoked. In step 214 the monitor module will be invoked subsequent to a positive verification of its integrity. Now a process being almost identical to the one described in FIG. 1 starts, with the major exception that not an application software but the monitor module will perform the process. For the further steps please refer to the description of FIG. 1.

Figure 3:
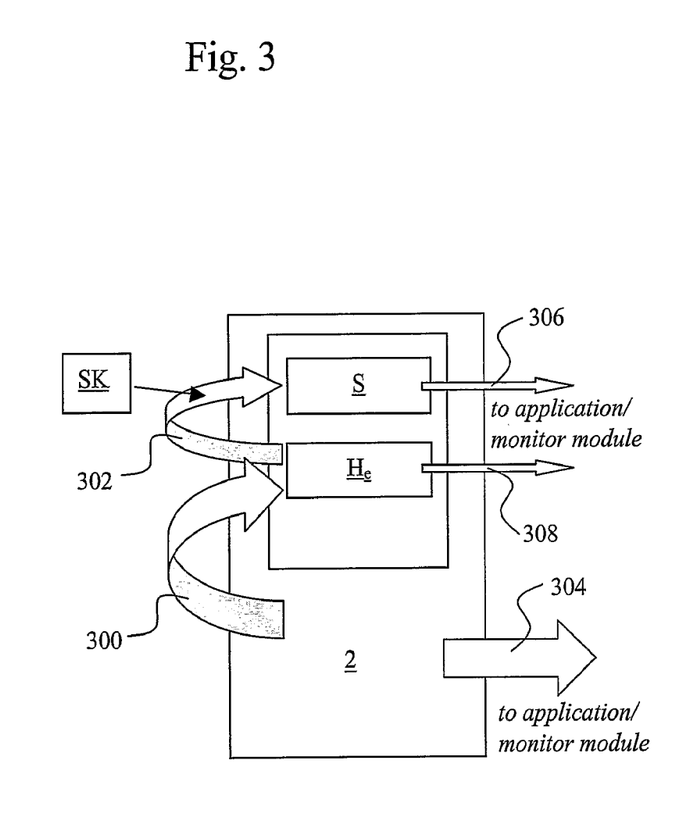
FIG. 3 is a schematic diagram of another embodiment of the inventive method, being performed with a platform software module.

FIG. 3 is an illustration of an embodiment of the invention for providing a software module 2 according to the invention. The following steps will usually be performed by the software provider of the respective software module. A hashing function is performed (step 300), over some or all segments of the software module, to derive a hash $H_c$. The hash $H_c$ is then signed using a signing key SK (step 302), which may be a secret or private key of a public/private key pair, to derive a signature S. In order to provide the software module in an electronic device a preferred way is to include the computed hash $H_c$ and the corresponding signature S integrated in the software module. Such integration may for example be to include hash $H_c$ and signature S as static variables. When later performing a hashing function for verification on the software module this part is of course not used. However in special cases the signature S and even the hash $H_c$ may be provided separately from the software module in the electronic device. For such purposes memory devices can be used for providing the module not permitting access for possible attackers, like Read Only Memories ROM or the like.

When a software module as described here is to be verified an application software, or in another embodiment of the invention a monitor module, will perform a hashing function, indicated by 304, on the software module. Of course the hash $H_c$ and the signature S, if included, will not be used by the hashing function. The application software or monitor module will also access the hash $H_e$ and the signature S (indicated by 306 and 308) for the verification.

Figure 4:
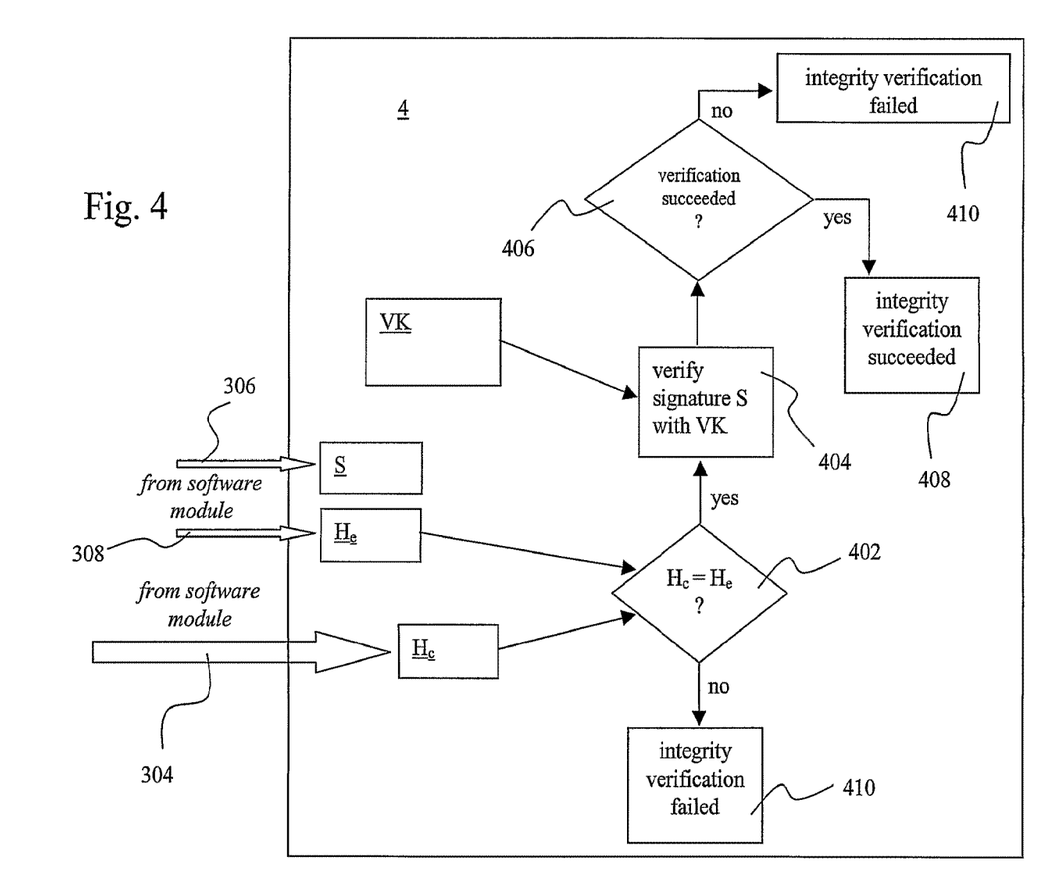
FIG. 4 is a diagram showing steps of an embodiment of the method according to the invention, the steps being executed by application software.

FIG. 4 is a diagram showing steps of an embodiment of the method according to the invention, the steps being executed by application software 4. When a software module (not shown, see FIG. 3) is to be verified the application software 4 will perform a hashing function, indicated by 304, on the software module, to derive a computed hash $H_c$. Of course a hash $H_e$ and a signature S, if included in the software module, will not be used by the hashing function. The application software 4 will also access the hash $H_e$ and the signature S (indicated by 306 and 308) for the verification. In step 402 the verification starts with comparing the hashes $H_c$ and $H_e$. If they are not identical are corresponding verification fails (step 410). Otherwise the verification continues, in step 404, with verifying the signature S using the verification key VK. The verification key VK may be embedded in the application software 4, but may as well be obtained from an external source (internet server or the like). If the verification succeeds, i.e. if it can be confirmed (step 406) that the signature S was derived by signing hash $H_e$ with the signing key (not shown) which corresponds to the verification key VK, integrity verification has been successfully concluded. Of course otherwise, i.e. if either the hashes $H_c$ and $H_e$ do not match or the signature S is not positively verified, the verification will fail (step 410). In case of a positive verification the integrity of the respective software module is intact, and it may subsequently be used by the application software 4. In case of a failed verification further access to the respective software module will be denied.

Figure 5:
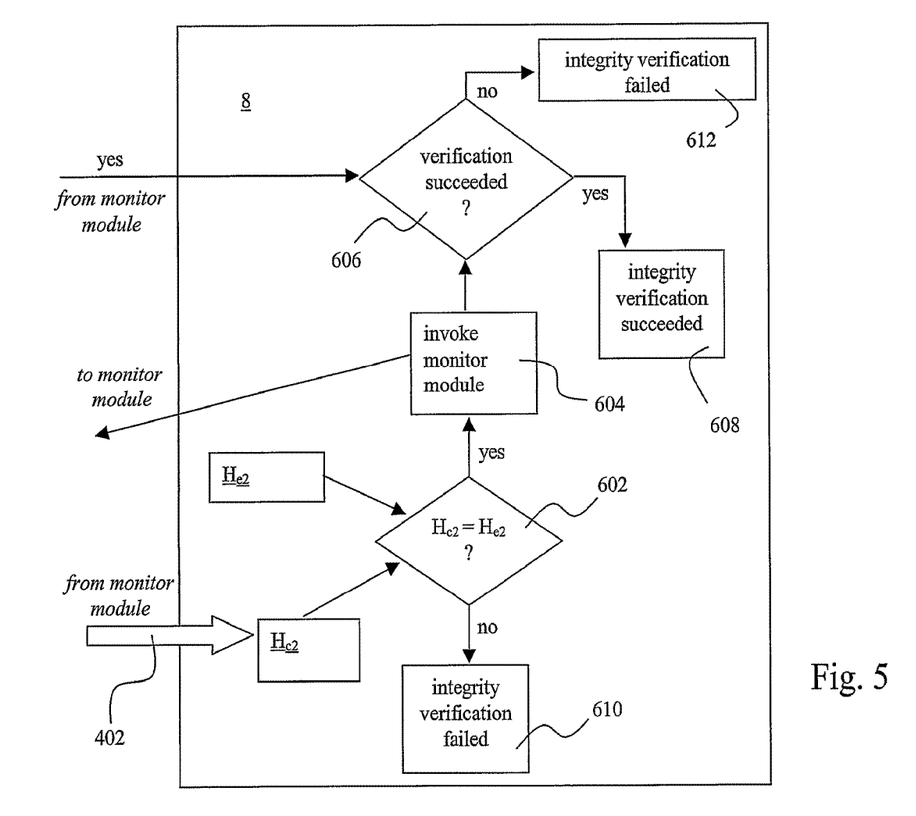
FIG. 5 is a diagram showing steps of an embodiment of the method according to the invention, the steps being executed by application software.
Figure 6:
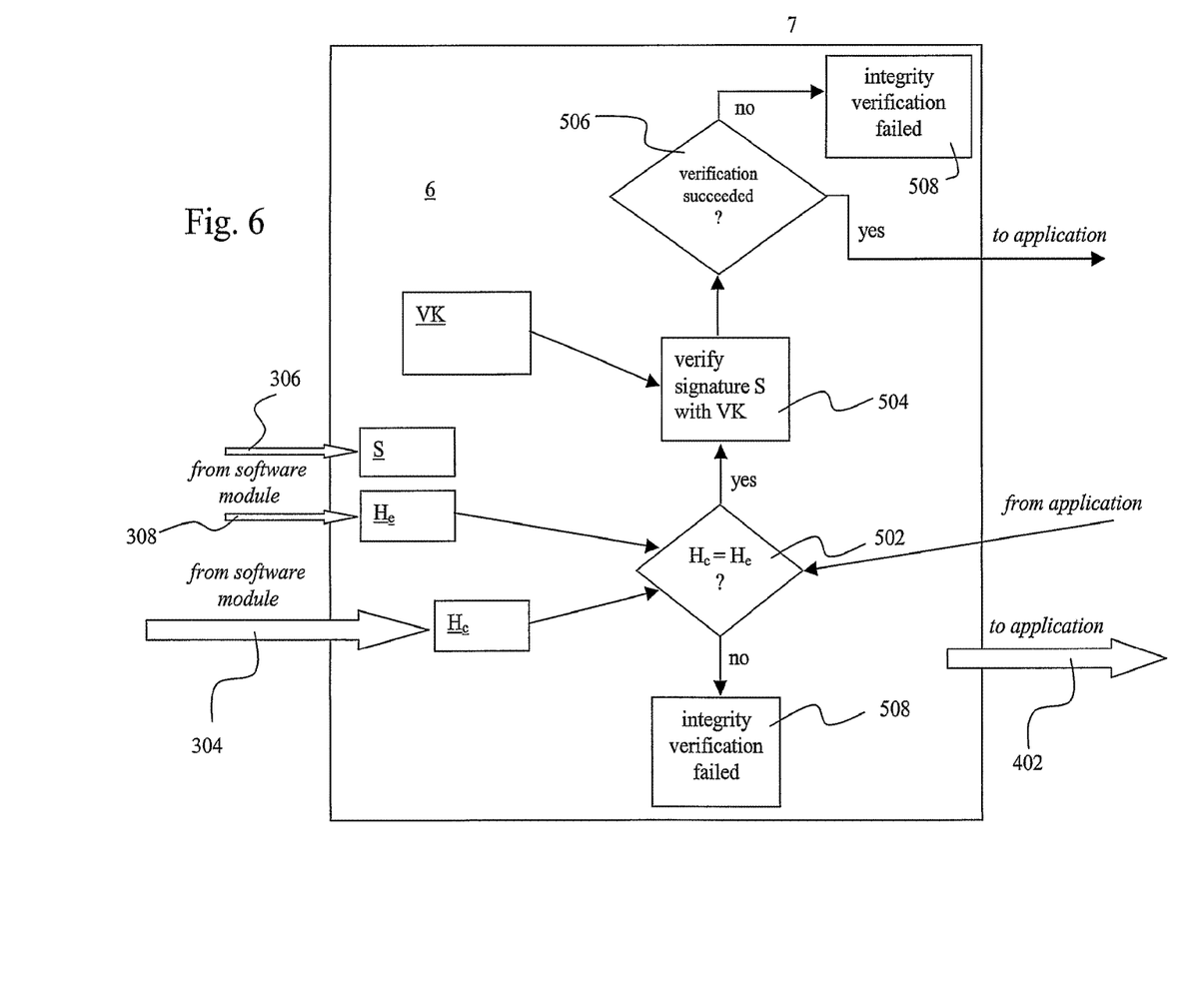
FIG. 6 is a diagram showing steps of an embodiment of the method according to the invention, the steps being executed by a monitor software module.

FIG. 5 is to be read in conjunction with FIG. 6, which has been separated for sake of intelligibility. FIG. 5 depicts the steps of an embodiment of the invention that are performed by an application software 8. First in step 402 a hashing function is performed on a monitor module to derive a computed hash $H_{c2}$, the monitor (not shown, see FIG. 6) module being a part of the platform software of an electronic device. An expected hash $H_{e2}$ is obtained, which may either be embedded into the application software 8 or be received from an external source. As the monitor module is a part not being supposed to change, this hash $H_{e2}$ can thus also be distributed over the internet or the like. In step 602 the hashes $H_{c2}$ and $H_{e2}$ are compared to determine if they match or correspond. In case they do not, verification of the monitor module ends with a failed result (step 610), and it will thus not be invoked to proceed with the verification. Otherwise the monitor module is invoked to perform the main part of the verification procedure according to this embodiment (see FIG. 6). If the monitor module returns a positive verification, indicated by "yes", integrity verification has succeeded (step 608). Either a negative verification result may also be received (not shown), or the application software 8 may derive a negative outcome, if no positive answer is given by the monitor module in a certain timeframe. The application software 8 may now safely use the respective software module (not shown) the monitor module has checked. If the monitor module does not return a positive verification, verification will fail (step 612).

FIG. 6 describes the steps that follow an invocation of the monitor module as mentioned in conjunction with FIG. 5. When a software module (not shown, see FIG. 3) is to be verified the monitor module 6 will perform a hashing function, indicated by 304, on the software module, to derive a computed hash $H_c$. Of course a hash $H_e$ and a signature S, if included in the software module, will not be used by the hashing function. The monitor module 6 will also access the hash $H_e$ and the signature S (indicated by 306 and 308) for the verification. In step 502, following an invocation according to what has been describes in FIG. 6, the verification starts with comparing the hashes $H_c$ and $H_e$. If they are not identical are corresponding verification fails (step 508). Otherwise the verification continues, in step 504, with verifying the signature S using the verification key VK. The verification key VK may be embedded in the monitor module 6, but may as well be obtained from an external source (internet server or the like) in a sufficiently trustworthy manner. If the verification succeeds, i.e. if it can be confirmed (step 506) that the signature S was derived by signing hash $H_e$ with the signing key (not shown) which corresponds to the verification key VK, integrity verification has been successfully concluded. Otherwise the verification continues, in step 504, with verifying the signature S using the verification key VK. The verification key VK may be embedded in the monitor module 6, but may as well be obtained from an external source (internet server or the like) in a sufficiently trustworthy manner. If the verification succeeds, i.e. if it can be confirmed (step 506) that the signature S was derived by signing hash $H_e$ with the signing key (not shown) which corresponds to the verification key VK, integrity verification has been successfully concluded. The positive outcome of the verification is sent to the application software (not shown), indicated by "yes". On the side of the monitor module the verification is now completed. Of course otherwise, i.e. if either the hashes $H_c$ and $H_e$ do not match or the signature S is not positively verified, the verification will fail (step 508). The negative verification outcome may also be sent (not shown) to the application. Another possibility is to use a certain timeframe. If in that timeframe no positive verification is sent to the application it may derive a negative outcome thereof. In case of a positive verification the integrity of the respective software module is intact, and it may subsequently be used by the application software. In case of a failed verification further access to the respective software module will be denied by the monitor module.

Using such a monitor module can be advantageous, as the application software itself can use a very simple check to verify the integrity of the monitor module, while the monitor module itself performs the major part of the verification procedure. The monitor module can easily be integrated into the platform software.

Figure 7:
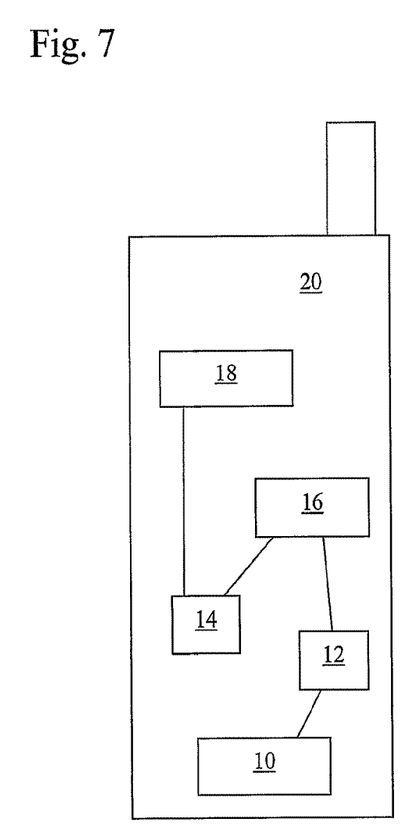
FIG. 7 shows an electronic device according to the present invention.

FIG. 7 shows an electronic device 20 according to the invention, which may be a mobile phone, PDA or the like. It comprises a loader component 10, a hash calculator component 12, a receptor component 14, a comparator component 16 and a verification component 18. The hash calculator component 12 is connected with both the loader component 10 and the comparator component 16. The receptor component 14 is connected with both the comparator component 16 and the verification component 18. The loader component 10 is adapted for accessing a module of the platform software of the electronic device 20. The hash calculator component 12 is adapted for performing a hash function on the platform software module to derive a computed hash. The receptor component 14 is adapted for obtaining an expected hash, a signature and a verification key. The comparator component 16 is adapted for comparing a computed hash from the hash calculator component 12 and an expected hash from the receptor component 14. The verification component 18 is adapted for verifying the signature, by applying the verification key so the signature.

The present invention utilizes (cryptographic) hash functions and asymmetric cryptographic keys, so-called public/private key pairs. Hash functions are take arbitrary binary data as an input and produce a fixed-size binary string as an output. Such hashing and asymmetric cryptography with public and private keys are in itself well known and therefore a detailed description is omitted here. While asymmetric keys are mainly used for encrypting data they may also be used for signing purposes. Using the private key a signature can be derived, for example by a software provider to enable his customers to verify the source of distributed software. The customers can apply the public key to the signature to verify that the software is authentic.

According to an exemplary embodiment of the present invention an application software verifies the integrity of platform software of an electronic device. Application software may be, for example, a game application, an office application, a drawing application, a calendar application, or some part of application software that is to be executed on the device. Platform software that is to be verified may be implemented on, for example, a computer, a mobile phone, a personal digital assistant (PDA) or the like.

The verification of platform software is carried out by an application software such that the application software accesses a software module of platform software and performs a hash function on the software module to derive a hash $H_c$. The hash function may be of any suitable kind for verifying part of a software. The derived hash $H_c$ is compared to an expected hash $H_e$ that is provided by the platform software module. The hash $H_e$ is created by performing a hash function on a selected platform software module and it is included in the platform software module; these steps will usually be performed by the provider of the platform software. The hash $H_e$ is then signed utilizing a signing key SK to derive a signature S that may be included in the platform software module or alternatively somewhere separate from the platform software module, in case the platform software module is stored in an untamperable location like a ROM or the like. Separating the platform software module and the signature S may in such cases be advantageous, especially if the software module cannot be easily reached by an attacker, as described above. In another exemplary embodiment the hash $H_e$ and the signing key SK are static variables that are included in the platform software module.

If hashes $H_c$ and $H_e$ match or correspond, respectively, the application software receives a signature S that is then being verified by a verification key VK. According to one embodiment the verification key VK is embedded in the application software and the signature S is provided by the platform software module. If the verification results of both aforementioned checks are positive, i.e. the authenticity of the software module has been confirmed, the verification is successful and further access to the respective platform software module is allowed. On the other hand, in case of a negative verification of the software module, i.e. if either the hashes $H_c$ and $H_e$ do not match or if the verification of the signature S is not successful, further access to the platform software module is denied.

According to one exemplary embodiment a monitor software module is utilized in verifying the integrity of the platform software module. Usually monitor software will be included in the platform software module and it is not expected to change when new platform software modules are installed and/or updated. In other words, in this embodiment the verification routine is part of the platform software module itself. Therefore the application software first needs to confirm that this monitor module is authentic. As this monitor module is supposed not to be changed at all, this can be achieved by using (static) integrity metrics. The application software performs a hash function on the monitor software module to derive a hash $H_{c2}$. The hash $H_{c2}$ is then compared with an expected hash $H_{e2}$, which is embedded in the application software. If hashes $H_{c2}$ and $H_{e2}$ match or correspond, the monitor software module is invoked to verify the integrity of the platform software module. On the other hand, in case of a negative verification of the monitor software module, i.e. if the hashes $H_{c2}$ and $H_{e2}$ do not match, further access to the monitor software module is denied. This will usually imply that the application software will not execute, as no integrity check may performed with the monitor module.

If the verification of the monitor software module succeeds, the monitor software module verifies the integrity of the platform software module. Similar to the aforementioned embodiments without the monitor module the monitor software module performs a hash function for the platform software module to derive a hash $H_{c1}$ and compares the hash $H_{c1}$ with an expected hash $H_{e1}$. Typically the hash $H_{e1}$ is provided by the platform software module, for example, as a static variable that is included in the module. If the hashes $H_{c1}$ and $H_{e1}$ match the monitor software uses a verification key VK embedded in the monitor software module to verify a signature S provided by the platform software module. If the result is positive, i.e. both aforementioned security checks give a positive result, the verification is successful and the application software is allowed further access to the platform software module by the monitor module. On the other hand, in case of a negative verification of the software module, i.e. if either the hashes $H_{c1}$ and $H_{e1}$ do not match or if the verification of the signature S is not successful, further access to the respective platform software module is denied by the monitor module. This will of course imply that the application software will not execute.

Especially verification keys must of course be obtained from a trusted source. The same holds basically true for expected hashes, however, faking such a hash will not be enough to circumvent the inventive concept completely, as the attacker will then have to fake also the signature, which in absence of the secret signing key may not be done without being noticed. Although in the embodiment with the monitor module the developer of a software has to obtain the expected hash of the monitor module from a trusted source under all circumstances, otherwise the protection scheme will of course not work.

It is to be noted that these approaches can also indirectly be used for a verification of the hardware platform. In other words, application software verifies the operating system module, which, in turn, is able to verify the hardware on which it is running. This is to ensure that for example a game application will not execute on an inappropriate platform. As it is quite common that many electronic devices of the same or even of different manufacturers share an identical operating system and/or parts of software precautions have to be taken to ensure a specific application will only run on those devices that are authorised and suitably equipped to use the application.

For example a game that is designed to run only on a mobile gaming deck like the Nokia® N-Gage may in principle be also executed on a mobile phone using the same operating system. As the phone will most likely not provide enough RAM memory, processing capability or required control and actions keys, respectively, or the like, it is not desirable that the game may be executed on the phone. The user will of course not be satisfied when he is not able to appropriately control the game. If the game uses a special key not present on the phone to terminate the game he might even be forced to shut down the phone by removing the battery to return to normal operation. Other issues that may occur are crashes or the occurrence of data losses, for example if the game uses up all available memory. Such effects are to be avoided by the present invention. On the one hand this improves usability and user comfort. On the other hand it may provide both the manufacturer of electronic devices and providers of application software with a fine-tuned control over which kind of software is allowed to run on which devices.

As mentioned before, the data required for verification must be obtained in a trustworthy manner in order to assure its integrity. When data is embedded in the application software (VK or $H_{e2}$) it must be protected from undetectable modification. This is achieved by, for example, the use of software obfuscation techniques.

When symmetric key digital signatures are used, in addition to integrity the secrecy of a key K must also be assured. Again, this can be achieved by the use of software obfuscation techniques.

It is to be noted that the present invention does not directly involve checking if certain hardware or software features are present that are required for an application. However this can be accomplished by the platform software and the present invention ensures that this platform software is authentic, or in other words, its integrity is valid. The platform software is then able to perform the mentioned checks and deny the execution of an application if this is necessary, in a way the provider of the platform software or the manufacturer of the respective electronic device wishes.

The invention claimed is:

1. A method for verifying integrity of software in an electronic device, the electronic device including platform software comprising a platform software module and a monitor module, the method comprising:
   accessing the monitor module;
   performing a hash function on the monitor module to derive a first computed hash;
   obtaining a first expected hash associated with the monitor module;
   determining whether the first computed hash matches the first expected hash;
   invoking the monitor module at least based on a determination that the first computed hash matches the first expected hash; and
   performing, by the invoked monitor module, an integrity verification procedure on the platform software module.

2. The method of claim 1, wherein the step of performing the integrity verification procedure comprises:

performing a hash function on the platform software module to derive a second computed hash;
obtaining a second expected hash associated with the platform software module;
comparing at least a portion of the second expected hash with a corresponding portion of the second computed hash;
obtaining a signature associated with the platform software module;
obtaining a verification key corresponding to the platform software module;
verifying the signature using the verification key; and
responsive to the comparing step determining that at least a portion of the second expected hash matches a corresponding portion of the second computed hash, in combination with the verifying step successfully verifying the signature, returning a positive result about the integrity verification procedure.

3. The method of claim 2, wherein the second expected hash is included in the platform software module as a static variable.

4. The method of claim 2, wherein the step of obtaining the verification key comprises receiving the verification key from a source external to the electronic device.

5. The method of claim 2, wherein the second expected hash is embedded in the monitor module as a static variable.

6. The method of claim 2, the verification key is one key in a public/private key pair.

7. The method of claim 1, wherein the step of obtaining the first expected hash comprises receiving the first expected hash from a source external to the electronic device.

8. The method of claim 1, wherein the accessing, performing a hash function, obtaining, determining, and invoking steps are performed by application software on the electronic device;
wherein the method further comprises:
using the platform software module by the application software if the monitor module returns a positive result about the integrity verification procedure.

9. The method of claim 8, wherein the first expected hash is embedded in the application software as a static variable.

10. The method of claim 1, wherein the monitor module is non-changeable when the platform software module is updated.

11. An electronic device, comprising:
platform software comprising a platform software module and a monitor module; and
software configured to verify the monitor module by a plurality of operations comprising:
accessing the monitor module;
performing a hash function on the monitor module to derive a first computed hash;
obtaining a first expected hash associated with the monitor module;
determining whether the first computed hash matches the first expected hash; and
invoking the monitor module at least based on a determination that the first computed hash matches the first expected hash;
wherein the monitor module, responsive to invoking by the software, is configured to perform an integrity verification procedure on the platform software module.

12. The device of claim 11, wherein the monitor module is configured to perform the integrity verification procedure by a plurality of operations comprising:
performing a hash function on the platform software module to derive a second computed hash;
obtaining a second expected hash associated with the platform software module;
comparing at least a portion of the second expected hash with a corresponding portion of the second computed hash;
obtaining a signature associated with the platform software module;
obtaining a verification key corresponding to the platform software module;
verifying the signature using the verification key; and
responsive to the comparing step determining that at least a portion of the second expected hash matches a corresponding portion of the second computed hash, in combination with the verifying step successfully verifying the signature, returning a positive result about the integrity verification procedure.

13. The device of claim 12, wherein the second expected hash is included in the platform software module as a static variable.

14. The device of claim 12, wherein the monitor module is configured to obtain from a source external to the electronic device.

15. The device of claim 12, wherein the second expected hash is embedded in the monitor module as a static variable.

16. The device of claim 12, the verification key is one key in a public/private key pair.

17. The device of claim 11, wherein the software is configured to obtain the first expected hash from a source external to the electronic device.

18. The device of claim 11, wherein the software is application software on the electronic device;
wherein the application software is further configured to use the platform software module responsive to the monitor module returning a positive result about the integrity verification procedure.

19. The device of claim 18, wherein the first expected hash is embedded in the application software as a static variable.

20. The device of claim 11, wherein the monitor module is non-changeable when the platform software module is updated.

21. The device of claim 11, wherein the second expected hash is provided separately from the platform software module.

22. The method of claim 1, wherein the second expected hash is provided separately from the platform software module.

* * * * *